United States Patent [19]

Pearce et al.

[11] 4,271,933

[45] Jun. 9, 1981

[54] WHEELCHAIR BRAKE ATTACHMENT

[76] Inventors: James C. Pearce; Richard L. Williams, both of #17 Briercroft Office Park, Lubbock, Tex. 79412

[21] Appl. No.: 816,396

[22] Filed: Jul. 18, 1977

[51] Int. Cl.³ .............................................. B60T 1/04
[52] U.S. Cl. ...................................... 188/2 F; 188/29
[58] Field of Search ........................... 188/2 F, 19–22, 188/29; 74/526, 570

[56] References Cited

U.S. PATENT DOCUMENTS

| 582,899 | 5/1897 | Crandall | 188/20 |
| 2,077,569 | 4/1937 | Kish | 188/29 UX |
| 2,191,327 | 2/1940 | Snyder | 188/22 X |

Primary Examiner—Duane A. Reger
Attorney, Agent, or Firm—Wendell Coffee

[57] ABSTRACT

A wheelchair with two large rear wheels, two swiveling front wheels and an open front has handgrips located vertically above the two rear wheels. A connecting rod pivoted to a handle attached to each of the handgrips extends downward to a plunger slidably located within a sleeve removably connected to the frame. An adjustable arm extends from the plunger through a slot in the sleeve to a position proximate yet not contacting each of the rear wheels. When a lever on the handle and each handgrip are squeezed the lever pivots and forces the rod and plunger downward within the sleeve. The arm on the plunger contacts each wheel and brakes the wheelchair.

10 Claims, 7 Drawing Figures

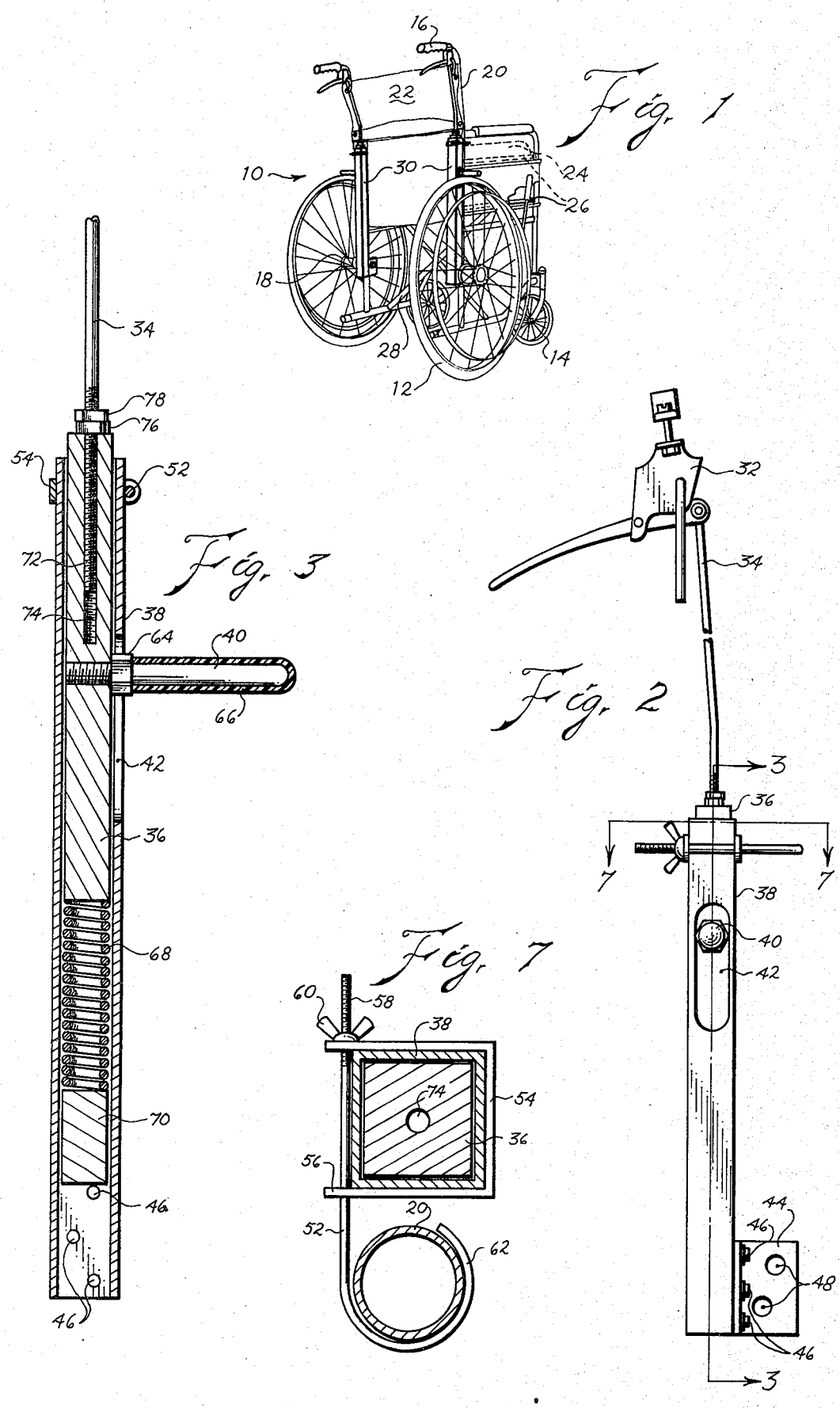

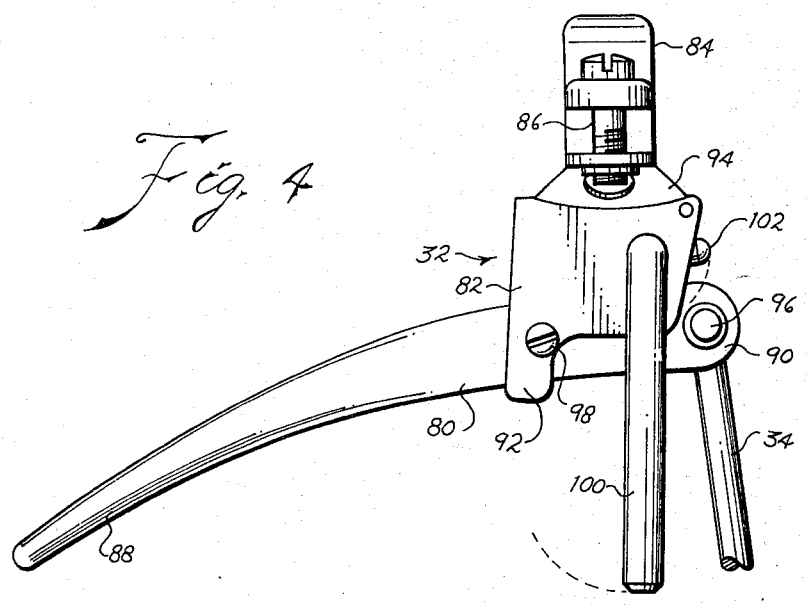
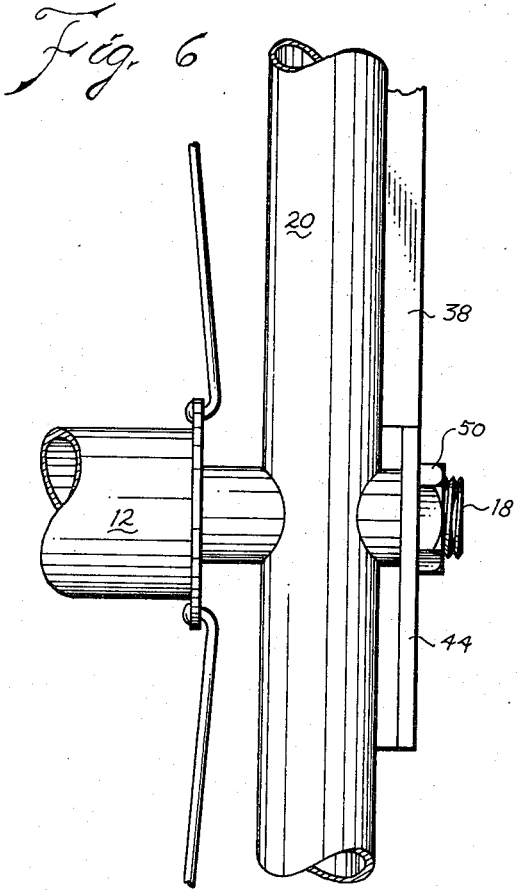
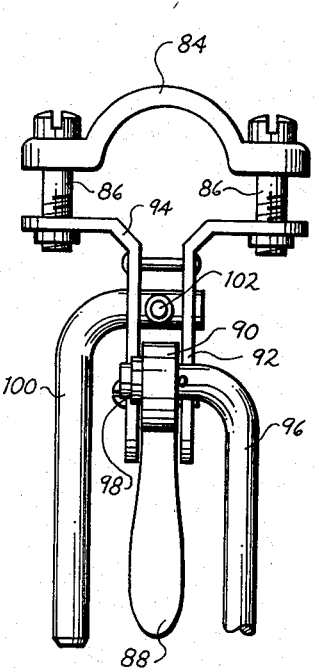

WHEELCHAIR BRAKE ATTACHMENT

BACKGROUND OF THE INVENTION

(1) Field of the Invention

This invention relates to attachable brakes for wheelchairs.

(2) Description of the Prior Art

Before our invention a problem existed with respect to maintaining wheelchairs stationary when loading patients or controlling the wheelchair when wheeling patients up or down ramps. A wheelchair with a patient therein has substantial momentum. When being pushed by a petite nurse or orderly it is not easily stopped. Therefore, some means of braking the wheelchair is needed.

Some workers in the art have employed mechanisms by which the patient can brake the wheelchair, and others have provided means by which a nurse or orderly pushing the wheelchair could apply the brake.

For example, MANISCALCO, U.S. Pat. No. 2,654,416, employs a brake frame on which a handle is mounted, pivoted to a walker frame and having a stop connected to the brake frame. When the handle is depressed by the patient, the stop contacts the wheel, thereby braking the walker. This device forms an integral part of the walker.

MARSHALL, U.S. Pat. No. 3,529,700, employs stops pivoted to the wheelchair frame which are held in contact with the wheels by springs. Levers pivoted to the wheelchair frame are connected by a flexible link to handles mounted on hand grips of the wheelchair. The nurse or orderly pushing the wheelchair from the rear disengages the stops from the wheels by squeezing the handles and handgrips together. The brake is normally set until disengaged by the operator or the weight of a patient in the wheelchair. The brake assembly also forms an integral part of, and is not readily detachable from, the wheelchair. The brake cannot be applied with a patient in the wheelchair.

An additional device conceived by Eddie Lunsford of Lubbock, Tex. became known to us before this application was filed. The Lunsford device employed bicycle caliper brakes connected to a bracket affixed to the wheelchair frame and connected to a handle on a handgrip by a flexible link. When the handle and handgrip were squeezed together, the bicycle calipers operated to come axially in contact with the wheel, thereby providing a braking force. The Lunsford device formed an integral part of the wheelchair structure.

The following are other prior devices of which we were aware prior to filing this application:
Finkbeiner, et al: 1,917,440;
Carter: 2,362,466;
Ames: 2,437,778;
Johnson: 3,237,940;
Eagleson, Jr., et al: 3,302,757.

SUMMARY OF THE INVENTION

(1) New and Different Function

We have invented a more useful system with which nurses and orderlies may brake wheelchairs while transporting or loading patients. We have accomplished this by inventing a brake attachment which is easily attached and detached and which may be used with folding wheelchairs. Our invention employs a handle connected to one of the handgrips of a wheelchair and a pitman pivoted to the handle. An arm connected to the pitman is disposed such that it is proximate to but not in contact with one of the wheels below the handle.

When the handgrip and handle are squeezed, the pitman is forced downward or in the direction of the wheel, thereby forcing the arm to come in contact with the wheel to provide the braking force. The pitman slides within a sleeve which is removably attached to the wheelchair frame.

Therefore, our wheelchair brake attachment does not form an integral part of the structure of the wheelchair. Because we have provided a removable attachment, our braking system may be universally applied to most wheelchains. In addition, our invention may be attached without permanent changes to the wheelchair, thereby making it also applicable to rented wheelchairs.

Our brake attachment accomplishes braking with a much simpler structure and much simpler operating method than does any of the prior art. Therefore, it is apparent that the total function of our invention is greater than the sum of the individual functions of the pitman, handle, sleeve, arm, etc.

(2) Objects of the Invention

An object of this invention is to brake wheelchairs.

Another object of this invention is to provide a brake attachment which is easily removed or connected to a wheelchair.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view of an embodiment of our invention attached to a wheel chair.

FIG. 2 is a side elevation view of our invention not attached to a wheelchair.

FIG. 3 is a partial side sectional view thereof taken substantially on line 3—3 of FIG. 2.

FIG. 4 is a side elevation view of the handle.

FIG. 5 is a front elevation view of the handle.

FIG. 6 is a partial elevation view of the anchor plate of the sleeve attached to the axle of the wheelchair.

FIG. 7 is a partial sectional view taken substantially on line 7—7 of FIG. 2 of the J-bolt attached to the frame member of the wheelchair.

DESCRIPTION OF THE PREFERRED EMBODIMENT

Referring to FIG. 1, wheelchair 10 has large rear wheels 12 and small front swiveling wheels 14. Handgrips 16, located vertically above the wheels 12, are connected to rear axles 18 by vertical frame members 20. The wheelchair 10 is of the folding type where flexible back 22 and flexible seat 24 may be folded, permitting the handgrips 16 and the rear wheels 12 to be moved proximate each other. When the wheelchair is folded, the horizontal braces 26 will be raised to the dotted line position shown in FIG. 1 to permit X-frame 28 to fold. The wheelchair 10 is also open in the front to permit easy loading of patients. Brake attachments, or two of the preferred embodiment of our invention, 30 are attached to the wheelchair 10.

Our invention attaches to each of the handgrips 16, the vertical frame members 20 and the rear axles 18. Referring to FIG. 2, the brake attachment 30 is shown to include: handle 32; connecting rod 34 and plunger 36 which form a pitman pivoted to the handle 32; and sleeve 38 which forms a slidable means for connecting the pitman or plunger 36 to the wheelchair 10.

Referring to FIG. 3, the assembly of the sleeve 38 and the plunger 36 may be seen to include the sleeve 38 with the plunger 36 slidably positioned therein. We prefer to employ square aluminum tubing for the sleeve 38 and square aluminum barstock for the plunger 36.

Arm 40 is adjustably attached to the plunger 36 in a position normal to the longitudinal axis of the plunger. The arm 40 projects through an arm slot 42 in the sleeve 38.

Anchor plate 44 is attached to the sleeve 36 by anchor bolts 46. The anchor plate 44 has axle holes 48 therein. The axle holes 48 provide a way to attach the anchor plate 44 to each of the rear axles 18 by removing an axle nut 50, placing the rear axle 18 through one of the axle holes 48 and tightening the axle nut 50 over the anchor plate 44 as shown in FIG. 6. Two holes are provided so that this attachment may be used on wheel chairs with different wheel diameters and different axle bolt diameters.

J-bolt 52 is connected to the top of the sleeve 38 by U-bracket 54. The J-bolt 52 is slidably located within U-bracket holes 56 in the U-bracket 54. The J-bolt 52 has a threaded end 58 on which is screwed J-bolt nut 60. By adjusting the J-bolt nut 60 along the length of the J-bolt 52, the distance between curved portion 62 of the J-bolt 52 and the sleeve 38 may be adjusted, as shown in FIG. 7.

Additionally, the U-bracket 54 is not fixed to the sleeve 38 but is slidable along the vertical length of the sleeve 38. Upon folding the wheelchair, horizontal brace 26 slides up and down the vertical frame brace 20 between the dotted line and solid line positions, as shown in FIG. 1. This necessitates the location of the J-bolt 52 at a point above the highest vertical travel of the horizontal brace 26.

Referring to FIG. 7, the J-bolt 52 is shown to have the curved portion 62 around the vertical frame member 20. The J-bolt nut 60 permits adjustment of the J-bolt 52. The adjustable J-bolt 52 and the two axle holes 48 in the anchor plate 44 allow rigid attachment of the sleeve 38 to various types of wheelchairs 10.

The arm 40 will be proximate, yet not in contact with the wheel 12 such that the plunger 36 need be depressed only a small amount in order to apply braking force. The arm slot 42 as shown in FIG. 2 may at first appear to be of greater length than necessary. However, the arm slot 42 is of extra length to facilitate the lengthening or shortening of the connecting rod 34. Because the anchor plate 44 is attached to the axle 18 of the wheel 12, the sleeve 38 will be in about the same position for most wheelchairs 10. Therefore, the arm slot 42 allows position adjustment of the arm 40 for wheelchairs 10 with different diameter wheels 12.

The length of the arm 40 may be adjusted by loosening arm locking nut 64, screwing a threaded end of arm 40 into or out of the plunger 36 and retightening the arm locking nut 64. We prefer to place a rubber sleeve 66 around the arm 40 in order to provide increased friction when the arm 40 is brought into contact with the wheel 12, to prevent wear of the wheel 12, and to serve as a cushion should anything come in contact with the arm 40.

Helical compression spring 68 shown in FIG. 3 bears against the bottom of the plunger 36 and the top of plug 70. The plug 70 is made of square aluminum barstock and is fixed within the sleeve 38 by the anchor bolts 46. The helical compression spring 68 provides a resilient means for urging the arm 40 away from the wheel 12.

The connecting rod 34 is adjustably connected to the plunger 36 in the following manner, as shown in FIG. 2. The connecting rod 34 has a threaded end 72 which extends through a connecting rod hole 74 in the top of the plunger 36. Adjustment nut 76 and locking nut 78 are threaded on the threaded end 72 to provide the capability for adjustment of the length of the connecting rod 34.

Referring to FIG. 4, the handle 32 basically includes curved lever 80 and fulcrum piece 82. The lever 80 has a grip end 88 and rod end 90. The fulcrum piece 82 has clamp 84, handle bolts 86, bifurcations 92 and clamp end 94. The connecting rod 34 has a pivot end 96 pivoted to the lever pivot end 90. The lever 80 within the bifurcations 92 is journaled mediate the ends of the lever 80 to the fulcrum piece 82 by pivot pin 98. The clamp end 94 is connected to the clamp 84 by the handle bolts 86 with the handgrip 16 between the clamp end 94 and the clamp 84.

Therefore, when the elements of the brake system are assembled as described above and connected to a wheelchair as specified, the following functioning may be seen to occur.

When a nurse or orderly is pushing a wheelchair 10 with a patient therein and desires to stop it, he or she merely squeezes the lever grip end 88 and the handgrip 16 together. This will pivot the lever 80 about the pivot pin 98, thereby forcing the connecting rod 34 downward. This will also force the plunger 36 downward within the sleeve 38, thereby bringing the arm 40 in contact with the wheel 12, and braking the wheelchair 10.

Our brake attachment, when attached to the wheelchair 10, is rigid, sturdy, and easily detachable. To remove the brake attachment 30, only two nuts and two bolts need be loosened. The two handle bolts 86 must be unscrewed from the clamp end 94. The J-bolt nut 60 must be loosened to enable the curved portion 62 of the J-bolt 52 to be removed from the vertical frame member 20. The axle nut 50 must be unscrewed, the anchor plate 44 removed and the axle nut 50 replaced. This simple operation of removing and, in reverse order, installing our invention inbues it with great versatility and utility.

It is desirable to be able to lock the brakes. To accomplish this, we have provided a lock to maintain the arm 40 in contact with the wheel 12. The lock includes L-shaped locking lever 100 pivoted to the bifurcations 92 of the fulcrum piece 82 with stud 102 fixed to the locking lever 100 within the bifurcations 92. The stud 102 is of such dimensions and placement that when locking lever 100 is moved through the arc shown by the dotted lines in FIG. 4, the stud 102 depresses the lever rod end 90, thereby forcing the connecting rod 34 and plunger 36 downward. Until the locking lever 100 is moved to the original position shown in FIG. 4, the arm 40 will be maintained in contact with wheel 12.

By employing the structure as shown for the lock, several beneficial results are obtained. If it is desired that the lock be disengaged, the lever grip end 88 is squeezed to the handgrip 16. This removes tension from the stud 102 and allows the weight of the locking lever 100 to move it to the original position shown in FIG. 4. Simultaneously the connecting rod 34 and plunger 36 move upward.

In addition, the locking lever 100 is easily grasped at the same time the lever 80 is grasped, or as the lever 80 is held. This is particularly useful when nurses or orderlies are wheeling patients about and leaving them for short periods of time.

As shown in FIG. 1, we prefer to employ two of our inventions on each wheelchair connected proximate each rear wheel 12. This provides even braking by allowing the nurse or orderly to squeeze both handgrips and lever grip ends simultaneously, thereby braking the rear wheels at the same time. Our invention is easily detached and attached, and requires no permanent changes in the wheelchair. In addition to being versatile with regard to rental wheelchairs and the like, our invention may be used with several wheelchairs by simply moving it among them.

Because of its simplicity of operation and design, our invention is applicable to a great many wheelchairs and is easily disassembled for repair or cleaning. Therefore, we have invented a brake mechanism for wheelchairs having great utility, versatility, and simplicity which results in a total functioning greater than the individual function of the lever, pitman, sleeve, bolts, nuts, etc.

Although hole 74 is shown in FIG. 3 as threaded, we prefer that it be smooth. Alternatively, the rod 34 could be screwed into a threaded hole 74 which would necessitate the removal of end 96 when adjusting the length of the pitman.

The embodiment shown and described above is only exemplary. We do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | | | |
|---|---|---|---|
| 10 | wheelchair | 56 | U-bracket holes |
| 12 | rear wheels | 58 | J-bolt threaded end |
| 14 | front wheels | 60 | J-bolt nut |
| 16 | handgrips | 62 | J-bolt curved position |
| 18 | rear axles | 64 | arm locking nut |
| 20 | vert. frame member | 66 | rubber sleeve |
| 22 | flexible back | 68 | helical compression spring |
| 24 | flexible seat | 70 | plug |
| 26 | horizontal brace | 72 | connecting rod threaded end |
| 28 | X-frame | 74 | connecting rod hole |
| 30 | brake attachment | 76 | adjustment nut |
| 32 | handle | 78 | locking nut |
| 34 | connecting rod | 80 | lever |
| 36 | plunger | 82 | fulcrum piece |
| 38 | sleeve | 84 | clamp |
| 40 | arm | 86 | handle bolts |

-continued

| | | | |
|---|---|---|---|
| 42 | arm slot | 88 | lever grip end |
| 44 | anchor plate | 90 | lever rod end |
| 46 | anchor bolts | 92 | fulcrum piece bifurcations |
| 48 | axle holes | 94 | fulcrum piece clamp end |
| 50 | axle nut | 96 | connecting rod pivot end |
| 52 | J-bolt | 98 | pivot pin |
| 54 | U-bracket | 100 | L-shaped locking lever |
| | | 102 | locking stud |

We claim as our invention:

1. On a wheelchair having
   a. a frame having frame members and an axle,
   b. at least one large wheel on the axle connected to the rear of the wheelchair,
   c. at least one swiveled small wheel connected to the front of the wheelchair, and
   d. handgrips connected to the rear of the wheelchair vertically above the rear wheel,
   e. said wheelchair being partially open at the front; the improved method of quickly attaching a braking system to the wheelchair comprising the following steps:
   f. clamping a handle pivoted to a pitman to the handgrip,
   g. clamping a top of a sleeve telescoped over the pitman to a frame member by a J-bolt, and
   h. anchoring the sleeve by placing a hole in a plate at the bottom of the sleeve over the axle of the wheelchair, thereby
   j. attaching a braking system to a wheelchair without permanently altering the wheelchair.

2. In a wheelchair having
   a. a frame including
      (i) at least one axle, and
      (ii) a vertical frame member,
   b. at least one rear wheel on the axle,
   c. at least one handgrip connected to the vertical frame member for pushing or pulling the wheelchair;
the improved brake system for the wheelchair comprising in combination with the above:
   d. a handle attached to the handgrip,
   e. a pitman slidably attached to the frame,
   f. said pitman being pivoted to said handle,
   g. an arm rigidly connected to the pitman,
   h. resilient means attached to the pitman for urging the arm away from the wheel,
   j. said handle and pitman providing brake means for engaging said arm with said wheel when the handle and handgrip are squeezed,
   k. the handle includes
      (i) a fulcrum piece having a clamp and bifurcations opposite the clamp,
      (ii) a lever pivoted by a pin mediate its ends between the bifurcations, and
      (iii) said clamp attached around said handgrip,
   m. said pitman including
      (i) a connecting rod pivoted to said lever at one end, and
      (ii) a plunger adjustably connected to the other end,
   n. said slidable attachment of the pitman to the frame including
      (i) a sleeve attached to the wheelchair frame, and
      (ii) said plunger fitting slidably within said sleeve,
   o. said arm being connected to said plunger,
   p. said arm projecting through a slot in the sleeve, q. the plunger being square barstock having a longitudinal axis, r. the sleeve being square tubing having a longitudinal axis s. a plug of square barstock located in the bottom of the sleeve, t. a spring bearing against the plug and the bottom of the plunger, thus forming said resilient means, and u. said sleeve being attached to the wheelchair frame by (i) a U-shaped clamp around the top of the sleeve, (ii) a J-bolt having a curved portion positioned through the U-shaped clamp, (iii) a nut on the J-bolt providing means for adjusting the distance between the curved portion of the J-bolt and the sleeve, (iv) a frame member of the wheelchair fitting within the curved portion of the J-bolt; and (v) an anchor plate rigidly attached to the bottom of the sleeve, (vi) said anchor plate having a hole therein, (vii) the axle of said wheelchair fitting within said hole, thereby (viii) securing the sleeve to the frame of said wheelchair.

3. The improved brake for attachment to a wheelchair comprising:

a. a handle adapted to be attached to a handgrip on a wheelchair, b. a connecting rod pivoted to a handle, c. a plunger adjustable connected to the connecting rod, d. said plunger having a longitudinal axis, e. a sleeve having a top and bottom adapted to be attached to a frame member of the wheelchair, f. said plunger slidably fitting within the sleeve such that the adjustable connection of the connecting rod and the plunger is proximate the top of the sleeve, g. an arm rigidly connected to the plunger, and h. resilient means in the bottom of the sleeve for pushing the plunger and the arm upward, thereby j. providing a brake which may be manually activated from a handgrip when attached, k. the handle including (i) a fulcrum piece having a clamp and bifurcations opposite the clamp, (ii) a lever pivoted by a pin mediate its ends between the bifurcations, and (iii) said clamp forming means for attaching said fulcrum piece to a handgrip of a wheelchair, m. the plunger being square barstock having a longitudinal axis, n. the sleeve being square tubing having a longitudinal axis, o. a plug of square barstock in the bottom of the sleeve, p. said arm projecting through a slot in the upper part of the sleeve, r. said sleeve having thereon (i) a U-shaped clamp around the top of the sleeve, (ii) a J-bolt with a curved portion through the U-shaped clamp, (iii) a nut on the J-bolt providing means for adjusting the distance between the curved portion of the J-bolt and the sleeve, whereby (iv) the top of the sleeve may be clamped to the frame member of a wheelchair, (v) an anchor plate rigidly attached to the bottom of the sleeve, and (vi) said anchor plate having an axle hole therein, whereby (vii) an axle of a wheelchair is utilized to anchor the bottom of the sleeve.

4. For a wheelchair having a. a frame having (i) frame members, and (ii) an axle, b. at least one large wheel on the axle connected to the rear of the wheelchair, c. at least one swiveled small wheel connected to the front of the wheelchair, and d. handgrips connected to the rear of the wheelchair vertically above the rear wheel, e. said wheelchair being partially open at the front; the improved brake for attachment to said wheelchair comprising:

f. a handle clamp adapted to be clamped to the handgrip, g. a pivot pin on said handle clamp, h. a lever pivoted to said pivot pin, j. a sleeve, k. a sleeve clamp on the top of the sleeve for clamping the top of the sleeve to the frame member, m. an anchor plate attached to the bottom of the sleeve, n. an axle hole in said anchor plate adapted to be placed over said axle and held thereon to anchor the bottom of the sleeve to the axle, o. a pitman telescoped in the sleeve, p. said pitman pivoted to said lever, q. an arm on the pitman adapted to contact said large wheel of the wheelchair when the sleeve is attached to the wheelchair, and r. a spring in said sleeve biasing said pitman upward to bias said arm away from said wheel.

5. The invention as defined in claim 4 with the additional limitation of s. an L-shaped rod journaled to said handle clamp, t. a stud connected to the L-shaped rod adjacent to the lever whereby rotation of the L-shaped lever will lock the lever in a brake applying position.

6. The invention as defined in claim 5 further comprising:

u. said handle clamp clamped to the handgrip of the wheelchair, v. said sleeve clamp clamped to the frame of the wheelchair, and w. said anchor plate attached to said axle of the wheelchair.

7. The invention as defined in claim 6 wherein the wheelchair includes x. two of said large wheels connected to the rear of the wheelchair, y. two of said swiveling small wheels connected to the front of the wheelchair, and z. a brake as defined above attached to said wheelchair for each of said two large wheels.

8. The invention as defined in claim 2 further comprising:

v. the handle has a lock including (i) an L-shaped rod, (ii) said L-shaped rod being journaled to the bifurcations of the fulcrum piece at a point proximate the pivot connection of the connecting rod, (iii) a stud connected to the L-shaped rod between the bifurcations, and
(iv) the stud projecting from the L-shaped rod a distance such that when the stud contacts the lever, the arm will be maintained in contact with the wheel, w. said arm being axially adjustable on the plunger,
x. said arm having a rubber sleeve fitted therearound,
y. the adjustable attachment of the connecting rod to the plunger including
(i) a hole in the top of the plunger,
(ii) a threaded end of the connecting rod slidably located within the hole in the top of the plunger,
(iii) an adjustment nut threaded on the connecting rod threaded end such that the nut contacts the top of the plunger, thereby adjusting the length of the connecting rod between the top of the plunger and the handle, and
(iv) locking nut threaded on the connecting rod above the adjustment nut providing means for fixing the adjustment nut in a single position on the connecting rod.

9. The invention as defined in claim 8 further comprising:
z. one of said improved brake systems being attached to each of said handgrips proximate each of said rear wheels.

10. The invention as defined in claim 3 further comprising:
s. the handle has a lock including
(i) an L-shaped rod,
(ii) said L-shaped rod being journaled to said bifurcations of the fulcrum piece at a point proximate the pivot connection of the connecting rod,
(iii) a stud connected to the L-shaped rod between the bifurcations, and
(iv) the stud projecting from the L-shaped rod such a distance that when the stud contacts the lever, the plunger and arm are moved downward, t. said arm being axially adjustable on the plunger,
u. said arm having a rubber sleeve fitted therearound,
v. the adjustable attachment of the connecting rod to the plunger including
(i) a hole in the top of the plunger,
(ii) a threaded end of the connecting rod slidably located within the hole in the top of the plunger,
(iii) an adjustment nut threaded on the connecting rod threaded end such that the nut contacts the top of the plunger, thereby adjusting the length of the connecting rod between the top of the plunger and the handle, and
(iv) a locking nut threaded on the connecting rod above the adjustment nut providing means for fixing the adjustment nut in a single position on the connecting rod.

* * * * *